P. Sweeney,
Dressing Stone.
Nº 25,287. Patented Aug. 30, 1859.
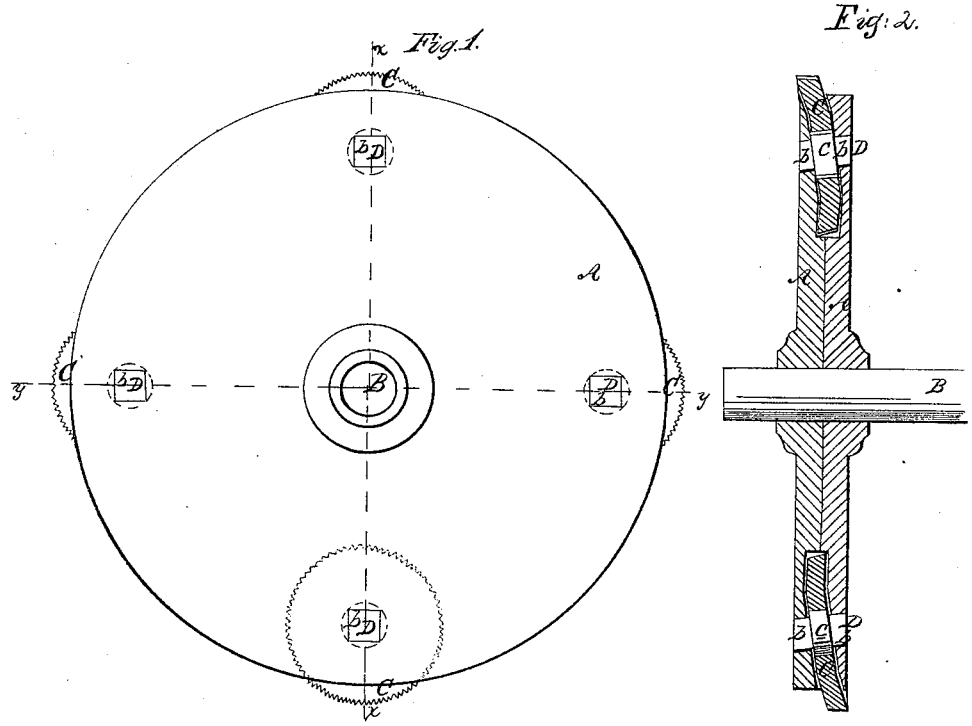
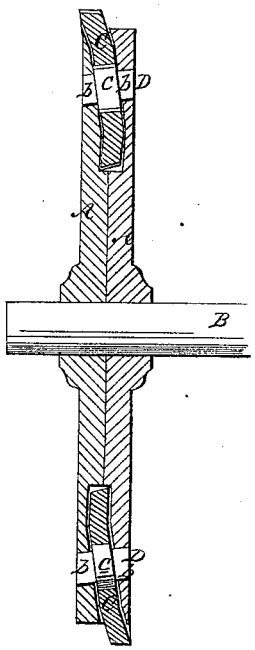
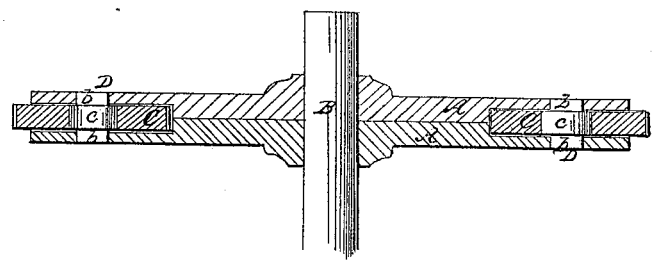
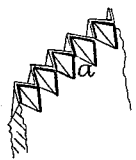
Witnesses:
Inventor:

UNITED STATES PATENT OFFICE.

PETER SWEENEY, OF BUFFALO, NEW YORK.

STONE-SAW.

Specification of Letters Patent No. 25,287, dated August 30, 1859.

*To all whom it may concern:*

Be it known that I, PETER SWEENEY, of Buffalo, in the county of Erie and State of New York, have invented a new and useful Improvement in Stone-Saws; and I do hereby declare that the following is a full, clear, and exact description of the same, reference being had to the annexed drawings, making a part of this specification, in which—

Figure 1, is a side view of my invention. Fig. 2, a section of the same, taken in the line $x$, $x$, Fig. 1. Fig. 3, a section of the same, taken in the line $y$, $y$, Fig. 1. Fig. 4, a section of a cutter wheel.

Similar letters of reference indicate corresponding parts in the several figures.

To enable those skilled in the art to fully understand and construct my invention I will proceed to describe it.

A, A, represent two circular plates or disks which may be of cast metal placed on a shaft B, and in close contact. These plates may be secured together, in any proper manner, for instance by bolts with their heads and nuts fitted in recesses made to receive them by a counter sink.

Between the plates A, A, a series of circular cutters C, are placed. These cutters may be of steel or chilled cast iron and they project beyond the peripheries of the plates A, A. Any proper number of cutters may be used and their peripheries may be serrated or cut like a saw or rasp, or may be of zig-zag form as shown clearly at $a$, in Fig. 4. The cutters C, are placed loosely on their axes D, so as to rotate thereon, the axes being stationary and having their ends $b$, which fit in the plates A, A, of square or round form. The central parts $c$, of the axes on which the cutters C, rotate are of course cylindrical and they are larger in diameter than the square ends $b$, and therefore prevent the axes from slipping out laterally from the plates. The axes D, are simply metal pins with the centers turned in cylindrical form and their ends squared or rounded. Two of the cutters C, are made of dish-form, and are placed obliquely between the plates, see Fig. 2, the others may be placed parallelly between the plates as shown in Fig. 3. By this arrangement the cutters will form a "kerf" sufficiently wide to receive the plates A, A. The axes D, of the oblique cutters are of course placed obliquely in the plates in order to make their peripheries project beyond the sides of the plates to form the wide "kerf" the two oblique cutters being placed in opposite positions as shown clearly in Fig. 2, but the axes of the other cutters are fitted in the plates at right angles with their plane of rotation as shown in Fig. 3.

The shaft B, of the plates A, A, may be rotated in any proper way, and the usual or any proper arrangement of means devised for applying the device to its work.

From the above description it will be seen that the cutters may be firmly retained in position as their axes D, have a bearing at each end and the plates also serve to support them preventing all lateral strain.

Although the plates A, A, are circular and rotated forming a rotary cutting tool, still essentially the same device may be used for a reciprocating cutting tool by having the cutters C, placed between rectangular plates and all the cutters bearing on the work at the same time.

The idea of attaching rotary cutters near the edges of disks and horizontal saws or plates, is not my invention nor is it broadly claimed by me, being seen in Samuel Chapman, Jr's. Patent Nover. 29, 1853. The difficulty heretofore attending the use of rotary cutters placed near the edges of disks or plates, is that the pivots of the said cutters having but one bearing, or being attached to the disks or plates only upon one side, soon causes the cutters to wear loose, allowing them to fall over sidewise, and thus to strike violently against the edges of the stone on entering the kerf thereof. The result is that the cutters soon become so bent and broken as to be unfit for use. But the double bearing could not be used with the revolving disk saws placed with their sides parallel with the side of the plate to which they are pivoted, without making the plate or plates wider than the saw-kerf. To obviate this difficulty and at the same time secure the advantages of the double bearings for the cutters I have devised the dish-formed cutter, and hung it obliquely between the plates.

The cutters being placed between two disks or plates, their pivots have a firm bearing at each end, and both sides of the cutters are firmly held up and protected by the plates between which they are secured, so that no matter how much the pivots of the cutters may wear or loosen the cutters themselves can never become bent or get out of place, while at the same time the kerf is as wide as the entire thickness of the plates.

In the use of my improvement no screws, rivets, or other devices are necessary to keep the pivots or the cutters in place. They may be said to be self-fastening, since the plates A, A, being pressed together at their centers, have a clamping action at their edges which serves to hold the pivots and cutters in proper place, without other fastenings. To remove any of the cutters it is only necessary to press apart the edges of the plates A, A, sufficiently far to allow the pivots (b) to slip out.

Having thus described my invention I claim as new and desire to secure by Letters Patent,—

The employment of two plates A, A, in combination with the disk form, cutters C, arranged substantially as and for the purpose herein shown and described.

PETER SWEENEY.

Witnesses:
H. WASSON,
R. R. HAYES.